Figure 6:
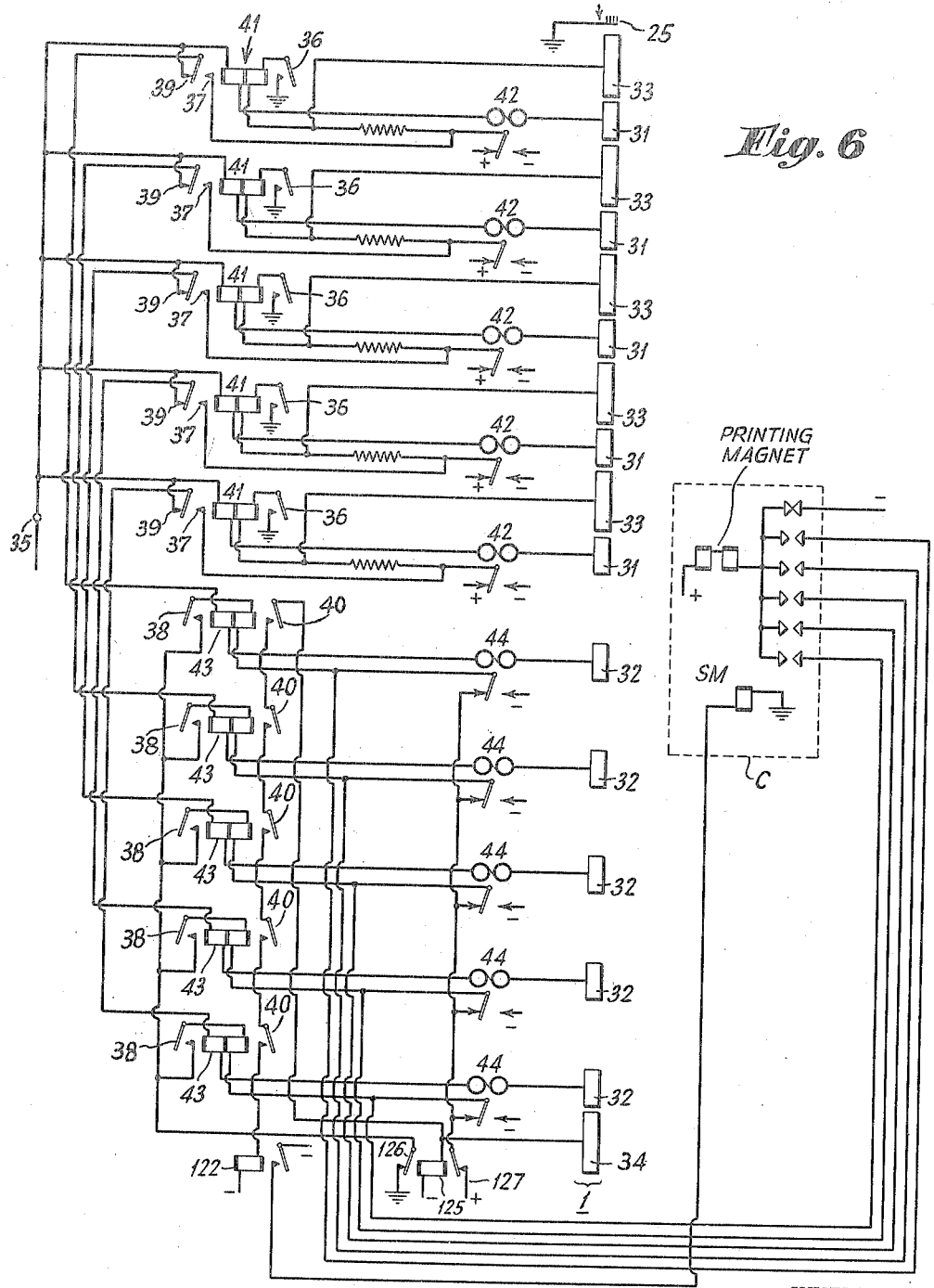

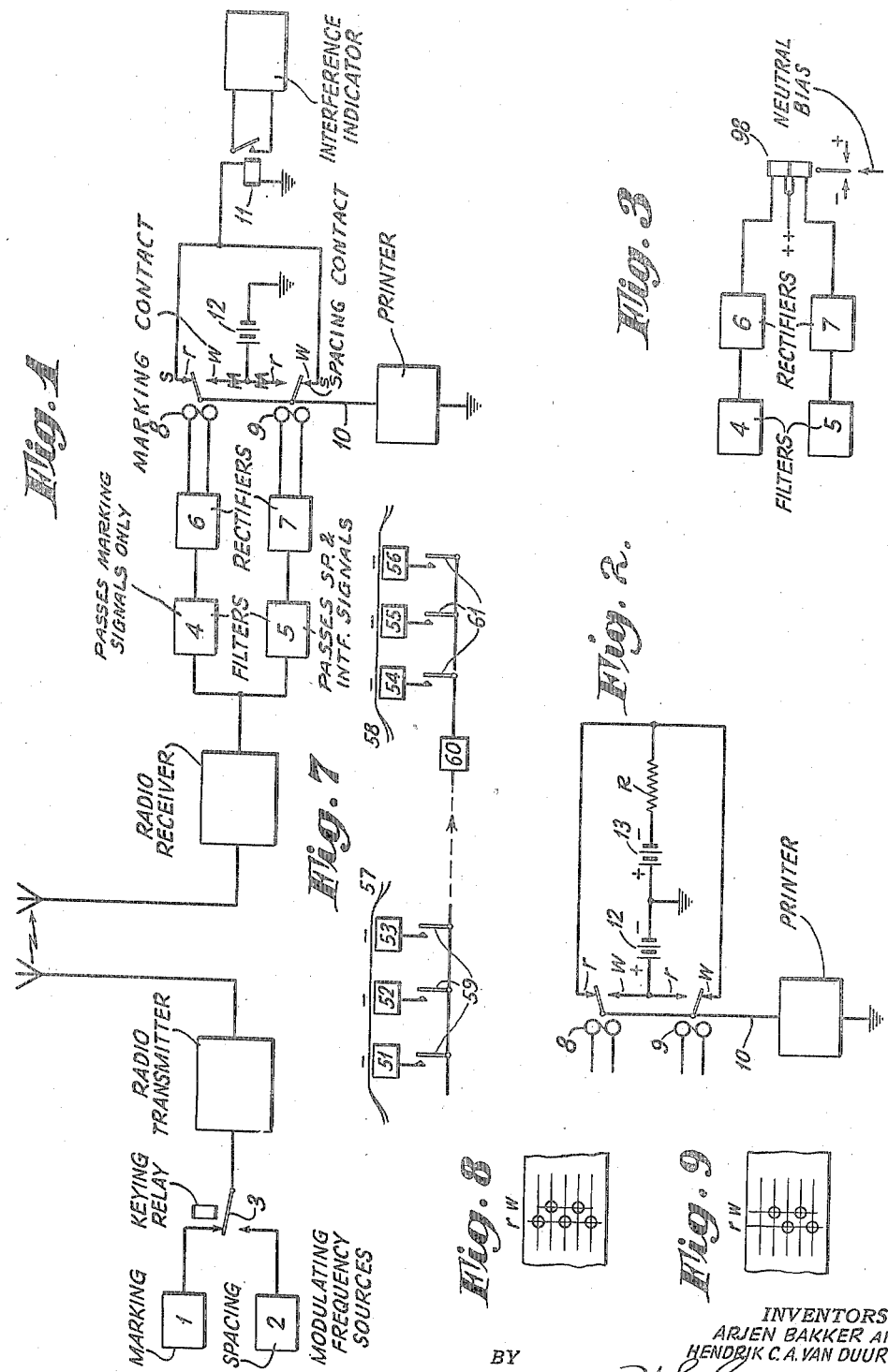

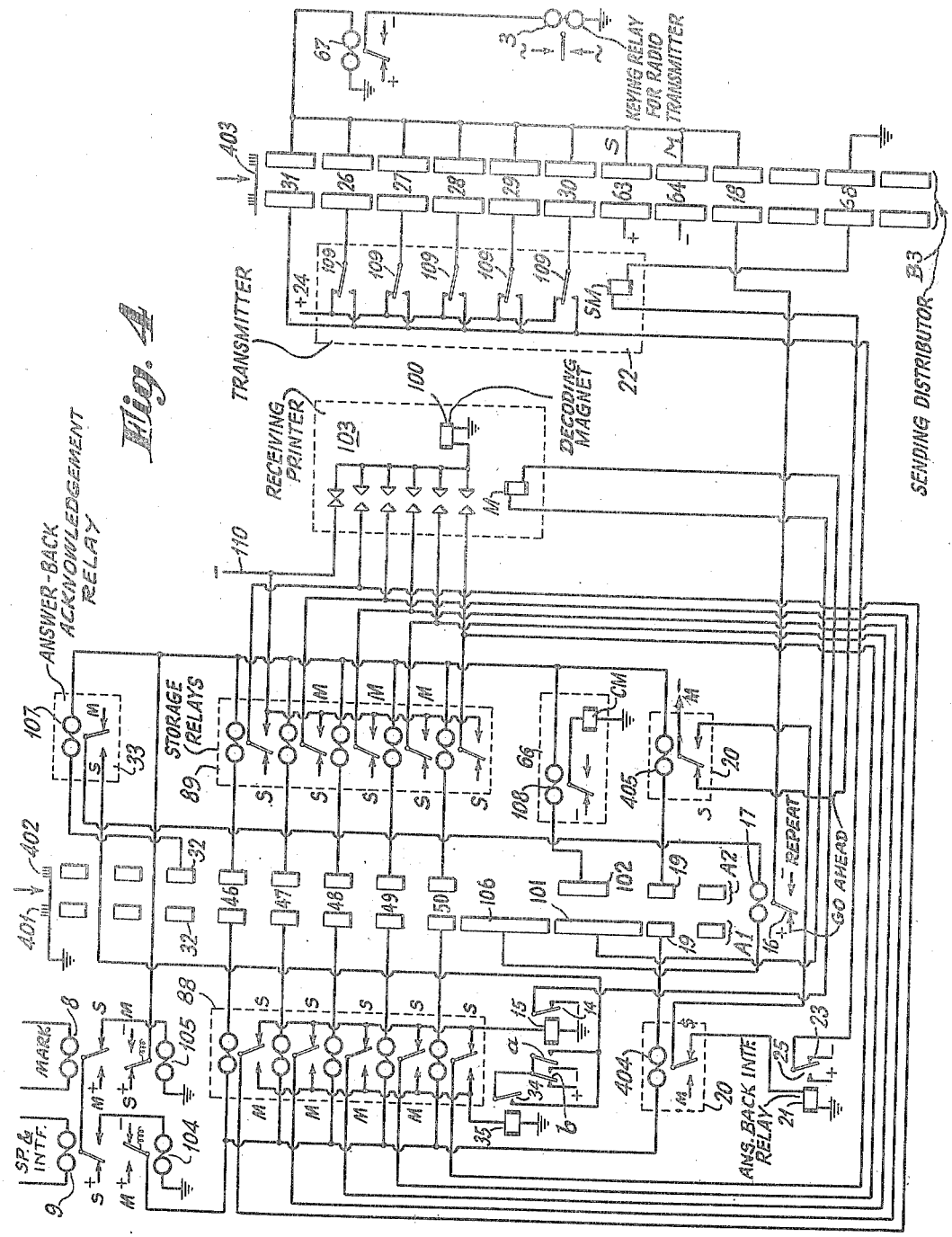

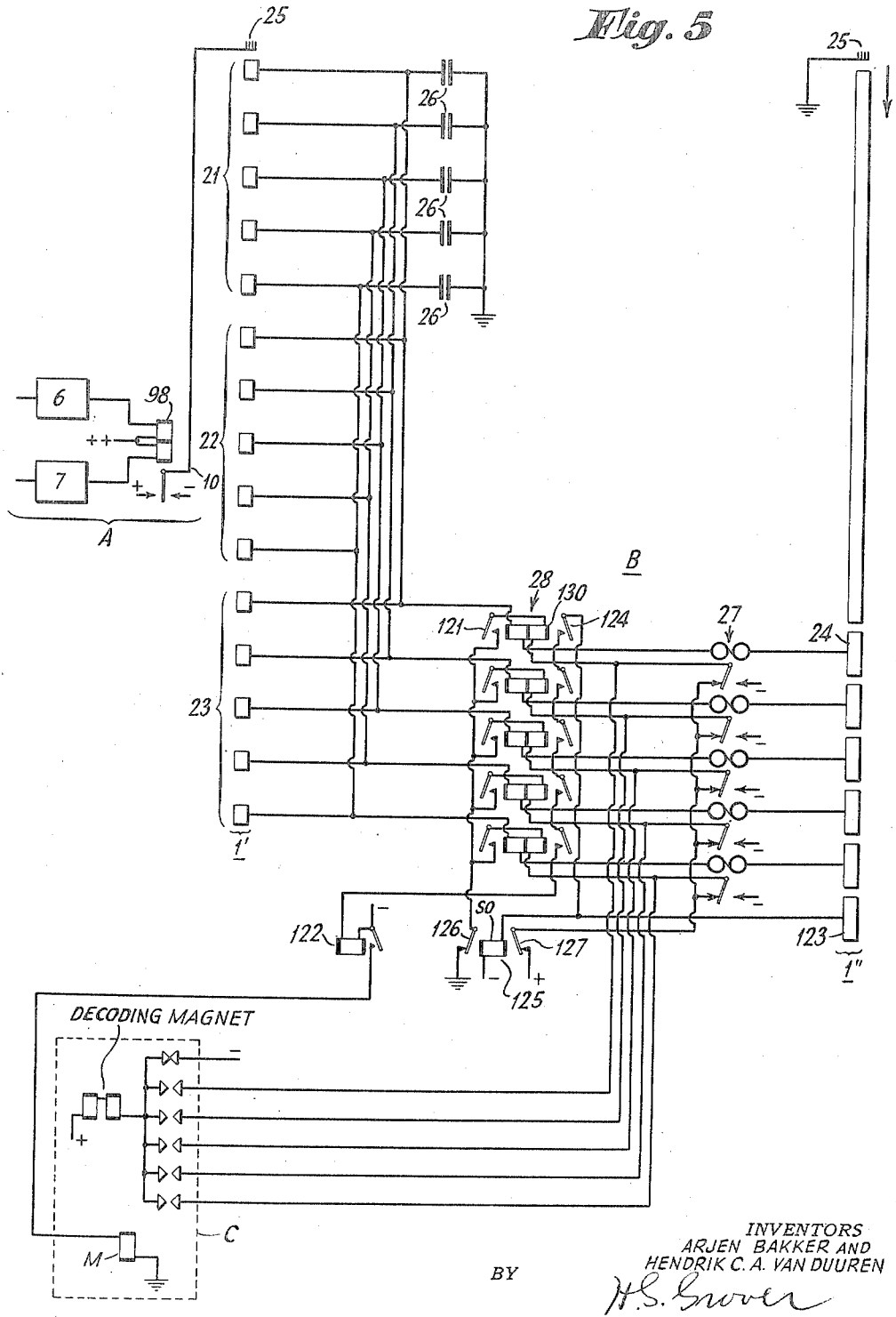

Patented Mar. 18, 1941

2,235,755

UNITED STATES PATENT OFFICE 2,235,755

ERROR CHECKING TELEGRAPH SYSTEM

Arjen Bakker, The Hague, and Hendrik Cornelis Antonie van Duuren, Wassenaar, Netherlands, assignors to Radio Corporation of America, a corporation of Delaware Application October 1, 1937, Serial No. 166,804
In Great Britain May 9, 1933

14 Claims. (Cl. 178—69)

This invention relates to error checking telegraph systems. It has particularly to do with apparatus for detecting errors in telegraph signals and for checking the operation of a printer so that printing of a character in response to a mutilated signal will be prevented. Another feature of the invention is the provision of means for transmitting a control signal from the receiving station to the transmitting station whereby and transmitter is caused to repeat a signal which had been mutilated.

The instant application is a continuation in part of our application, Serial No. 724,804, which was filed May 9, 1934, and which matured into Patent 2,119,196, dated May 31, 1938.

In operating a type-printing telegraph system on a signaling channel in which interference may occur, for example, a radio channel, a difficulty is encountered which is not present in systems wherein the actual signal is recorded. The difficulty is that a wrong signal cannot be recognized as such. In systems in which the actual signal is recorded it is occasionally possible for a skilled telegrapher to recognize wrong signals.

The object of the invention is to provide a type printing telegraph system in which the unnoticed reproduction of signals or signal elements wrongly received may be avoided.

This object is attained by transmitting the signals by means of double current. The working elements of the signals are transmitted by means of working or marking current and the resting elements by means of resting or spacing current. In the receiving circuit an error-detecting device is provided whereby the presence of disturbing impulses or the dropping out of signal elements is made recognizable.

The construction of the printing telegraph system so as to achieve the object of the invention results in a marked increase in efficiency.

According to the invention, the desired effect may be attained by the provision of a device having means controlled by the received working current and means controlled by the received resting current, which means so co-operate that extraneous and mutilated signal elements are made recognizable in the receiving apparatus either by preventing said signal elements from becoming effective in the receiving apparatus or by setting in operation an interference circuit.

The invention may be employed in all known type printing telegraph systems. It has particular advantages in two-way communication between two stations, and in systems in which, for the purpose of eliminating interference, each signal element is sent out several times by the transmitting device and is received as many times by the receiving device. These advantages will be explained more fully hereinafter.

The invention will be explained with reference to the accompanying drawings showing several constructional examples. In these drawings:

Figure 1 shows an error detecting device constructed according to the invention.

Figures 2 and 3 relate to modifications of the error detecting device.

Figure 4 shows a printing telegraph system as employed for two-way communication between two stations, and adapted for carrying out the invention.

Figures 5-9 relate to three constructional examples for systems in which the signals or signal elements are transmitted and received a plurality of times.

In Figure 1, the error detecting device comprises two relays, one of which is acted upon by the marking signal and the other by the spacing signal from the transmitter. The tongues of these relays co-operate in such a manner that when the reception is not disturbed so that one tongue rests in the working position and the other in the resting position, the received signal elements are passed on to the printer portion of the receiving apparatus.

If however, the reception is disturbed then consequently the tongues both lie in the working position, or both in the resting position. Although the mutilated signals are passed on, they are, nevertheless, designated as erroneous by means of an additional circuit which is rendered operative in response to the occurrence of the interference. It is also possible to prevent the actuation of the printing apparatus in response to mutilated signals.

When a carrier wave is used for the signaling channel, then it is preferable that this carrier be differentially modulated. One modulating frequency designates a "marking" element and another modulating frequency designates a "spacing" element. The two sources of modulating frequencies are transmitted alternately, one to produce the marking signal and the other to produce the spacing signal. They are shown at 1 and 2, and 3 is the tongue of the transmitting relay. However, this circuit arrangement of the transmitting station is merely illustrative and is not essential for the invention.

At the receiving end, means are provided for detecting the successively transmitted marking and spacing frequency currents. These signal currents are thereupon directed into separate circuits by known means such as filters 4, 5. The marking current and the spacing current are now fed to rectifiers 6 and 7 respectively and these rectifiers act upon relays 8 and 9 respectively. The tongue of relay 8 rests upon the contact $r$ when the rectifier 6 does not receive any signal voltage, and is moved to the contact $w$ when a current of marking frequency is rectified by the rectifier 6. The tongue of relay 9 correspondingly rests upon its contact $r$ when the rectifier 7 does not receive any spacing signal voltage or any interfering voltage, and is moved to the contact $w$ upon receipt of either of these voltages. The filter 5, however, is designed to reject the marking frequency and consequently the armature of relay 9 would remain on its idle contact $r$ during reception of a marking signal which is rectified by the rectifier 6.

The normal reception of unmutilated signals is such, therefore, that the tongue of relay 8 moves to its contact $w$, while the tongue of relay 9 is held on its contact $r$ during reception of a marking impulse. Furthermore, the tongue of relay 8 is held on its contact $r$, while the tongue of relay 9 is moved to its contact $w$ upon reception of a spacing impulse.

If, however, the received signal element is disturbed, either on account of the occurrence of an additional current impulse or due to the absence of a transmitted current impulse, both relay tongues are shifted to corresponding positions, that is both working or both resting. The cause may be a fading condition or any atmospheric disturbance.

The tongues of the relays 8 and 9 are electrically connected together and are also connected by a lead 10 to the printer apparatus. The resting contact of the relay 8 and the working contact of the relay 9 are connected together and to an interference relay 11, while the working contact of the relay 8 and the resting contact of the relay 9 are both connected to a source of current 12. One side of the relay 11 and one side of the source of current 12 are grounded.

With this connection, the interference relay 11 receives current when the tongues of both relays 8 and 9 occupy the resting position $r$ (interference through fading) or when they both occupy the working position $w$, (interference through an additional current impulse). In the event of undisturbed reception, on the other hand, the relay 11 does not receive any current.

The printing apparatus connected to the lead 10 receives marking current when the relay 8 is in the working position $w$ and the relay 9 is in the resting position $r$. It does not receive any current when the relay 8 is in the resting position and the relay 9 is in the working position, and it receives marking current when both relays occupy the same position (that is to say in the case of interference). In the last case, however, the received signal may be indicated as an error by means of the interference relay 11, or in any other manner. This relay, therefore, indicates erroneous signals with absolute certainty.

It is obvious that the interference relay 11 may be arranged to act upon the printer in many different ways. Thus, for example, a blank or another interference signal, such as a special printed sign, may be given. Furthermore, the starting of the printer may be prevented in systems in which the code signal is followed by a locally initiated printer actuating impulse. The practical execution depends upon the particular telegraph apparatus employed, and is not an essential feature of the invention.

According to a modification of the invention the occurrence of a wrong signal element may be rendered recognizable, by the employment of means responsive to such an erroneous signal for intercepting the working or resting current as supplied to the printer. The printer will then function as when "spacing" instead of printing erroneous characters. This feature is of considerable importance when using uniform length code signals in printing telegraph systems, as will be shown more clearly hereinafter.

Figure 2 illustrates how the relays 8 and 9 may be so employed that the disturbed signal element is kept away from the printer. As will be seen from this figure, the printer does not receive any current when the tongues of the relays 8 and 9 are both in the unoperated position $r$ or both in the operated position $w$, because the current sources 12 and 13 are of such potentials and the resistance R is so related to that of the printer circuit that the conductor 10 would then be substantially at ground potential. If, on the other hand, the received signal is undisturbed, the telegraph printer receives either positive marking current or negative spacing current from the current sources 12 and 13 respectively.

Figure 3 shows another constructional form. In the event of interference-free reception, the anode current of one of the rectifiers 6 or 7 flows through one or the two windings of the relay 98, so that the tongue of the relay rests against one of the two contacts. In the event of interference, current either flows through the two coils in opposite directions or else both coils remain unenergized. In both cases the tongue of the relay which always returns to the middle position, remains in this middle position, so that the printer does not receive any signal.

The invention as used in two-way communication renders it possible to repeat the transmission of a certain signal by one of two stations, if this signal is not correctly received at the other station. If, therefore, a signal is mutilated during transmission, it is repeated and if it is not mutilated it will not be repeated.

This method is preferably carried out in such a manner that the reception of the mutilated signal by station A results automatically in the transmission by station A of a monitoring signal back to station B whereby the signal is caused to be repeated by the latter station. Furthermore the reception of an interference-free signal results automatically in a monitoring signal being sent back, whereby the succeeding signals of a message are caused to be transmitted in regular course.

Figure 4 will serve for explanation of the foregoing. In this figure, a constructional form of the system is shown diagrammatically and as adapted to the use of the well known 5-unit code. The two-way or cross traffic takes place between two stations A and B, which are substantially constructed in the same way. For the sake of simplicity, the operation of the system will be described as when a communication originates at station B and is received at station A. So, although the transmitting and receiving apparatus has been shown as if located at only one station, the transmitting elements may be considered generally applicable to station B, and the receiving apparatus will be referred to as appropriate to station A. Where the description relates to so-called "answer-back" signaling, however, the reference numerals for parts at different stations have been given prefix letters A and B in the specification to indicate at which of the two stations the part in question is caused to function in the case of transmission of a message from station B to station A, the answer-back signal being transmitted in the reverse direction.

The receiving distributor A1, A2 of station A runs synchronously with the transmitting distributor B3 of station B, and the receiving distributor of station B runs synchronously with the transmitting distributor of station A. The two distributors in each station may be coupled together mechanically. It is immaterial whether synchronism is obtained by means of distributors moving continuously or discontinuously. In the present instance an installation with continuously rotating distributors has been assumed.

The correction current impulses for maintaining synchronism of the distributors in the transmitting station and the receiving station are sent out by the transmitting station B through distributor segments 63 and 64, and are received by the receiving station A on segment 65. The correction magnet CM of station A is connected to a protective device 66. The latter operates in the manner already described in the foregoing and may be so constructed, for example, that if an interference occurs, while the receiving distributor brush is traversing segment 102, the correction magnet of station A will not operate. Premature correction is, therefore, avoided.

The five elements of each signal are transmitted by station B, the procedure being to set the contact tongues 109 either up to obtain plus potential from the source 24, or down to obtain minus potential from the negative source which is normally available when relay 21 is unoperated and its armature 25 rests on the back contact 23. Segments 26 to 30 inclusive are traversed by brush 403 for the purpose of timing the code elements of each five unit signal. The signals are received at station A on segments 46 to 50 whence they are transferred to the protective device 88 and signal storing device 89. The protective device serves to ascertain whether one or more of the five signal elements received has been disturbed. If none of the five elements is disturbed, the interference relay 15 remains unenergized, and the actuating magnet M of the telegraph recording apparatus 103 receives a starting current impulse by way of the back contact 14 of relay 15 (to which negative battery potential is applied) and segment 101 of the distributor A1, which segment is grounded when traversed by brush 401. The telegraph printer 103 then becomes operative, receiving the signal elements stored up in storage relays 89 and causing suitable characters to be printed or recorded in the usual manner.

The transmitting distributor B3 comprises two rings of contact segments so arranged that each segment in one ring may be connected by the bridging brush 403 to a corresponding segment in the other ring. The contact brushes 401, 402, 403 are preferably adapted to be rotated in synchronism by a common driving motor.

The receiving relays 8 and 9 are the same as those shown in Figs. 1 and 2. They cooperate with relays 104 and 105 which have tongues spring-biased toward their negative contacts.

The relay group 88 comprises five polar relays, one for each of the five signal units constituting one complete signal. Five other relays are included in the group 89, each being paired with one of the relays of group 88.

An undisturbed marking signal causes relay 8 to move its armature against its left hand contact which supplies + potential to relay 104, assuming that relay 9 does not operate. Similarly an undisturbed spacing signal causes relay 9 to move its armature against its left hand contact which supplies + potential to relay 105, assuming that relay 8 does not operate. An interfering impulse is responded to by both relays 8 and 9, so that both relays 104 and 105 remain unenergized and their armatures both receive negative potential. A fading condition renders both relays 8 and 9 unresponsive, and the armatures of relays 104 and 105 are both held by their springs against their negative contacts. The negative potential actuates different relays of groups 88 and 89 in accordance with the operation of the grounded brushes 401 and 402, moving the armatures of relays to the right. Considering each separate pair of relays of the groups 88 and 89, their armatures are interconnected, and connections therefrom are carried to the code-element responsive devices in the receiving printer 103.

In connection with Fig. 4 it has been stated that the correction current impulses necessary for maintaining synchronism between the distributors of the transmitting and the receiving station are sent out by the transmitting station B on segments 63 and 64 and are received by the receiving station A on segment 102. According to well-known practice, synchronism is maintained by slightly shifting the distributor phase of the receiving station with respect to its own driving phase by means of a correction magnet which is energized as soon as a certain phase difference between the distributor of the transmitting station and that of the receiving station occurs.

From Fig. 4 it will be seen that the correction current impulses transmitted by the contact segments 63 and 64 comprise a positive (spacing) and a negative (marking) current impulse in succession. These current impulses are received by the contact segment 102 of the distant station. As this contact segment is connected to the tongue of the relay 105 by way of the relay 108 the latter will receive first a positive current impulse and then a negative current impulse. Under normal conditions this positive current impulse is not long enough to produce operation of the relay 108. If, however, the distributor phase of the receiving station is slightly in advance of the distributor phase of the transmitting station the positive current impulse will last long enough to cause the relay 108 to be energized, so that the correction magnet CM is actuated and operates to restore the desired synchronism in the manner outlined above. In Fig. 4 the correction magnet is shown in this operative position.

If the correction current impulses are received disturbed, an actuation of the correction magnet CM does not occur, as stated in connection with Fig. 4. This is for the purpose of preventing premature correction. The result of such a disturbed correction current impulse received by the contact segment 102 is that the tongue of the relay 105 is brought to its right-hand contact. In this position the relay 108 receives a negative current impulse so that the circuit of the correction magnet CM is interrupted.

Details of the answer-back system

In order that the transmitting station B may be controlled either to repeat a signal or to "go ahead" with the transmission of a succeeding signal, the receiving station A is provided with means for reporting either the mutilation of received signals or the reception of unmutilated signals. In the first place, as has been shown, the relays of group 88 in combination with the relays of group 89 with which they are individually paired provide for energizing relay 15 whenever a signal of marking frequency is accompanied by a disturbance, also whenever there is a fading condition. The negative potential from conductor 110 under these conditions is fed through one of the armatures of a relay in the group 89 to a corresponding armature of its twin relay in group 88 and thence to the relay 15, one terminal of which is grounded. On energization of relay 15 the actuating magnet M in the receiving printer 103 is disabled at the moment when brush 401 traverses segment 101.

Relay 15 also closes its contacts a and b against front stops one of which supplies negative potential to the left hand contact of relay 107, thus preparing this relay when it is closed to feed a negative pulse through relay 17. Such a pulse takes place when brush 401 traverses segment 106, causing the armature of relay 17 to be moved to its right hand contact. This contact supplies negative potential to the transmitting distributor segment 18 in station A. When the transmitting distributor brush 403 bridges the two segments 18 a repeat signal is initiated by relay 67 and 3, this repeat signal having a marking frequency characteristic. Station B responds to such a signal when its receiving distributor brushes 401 and 402 traverse segments 19.

If the transmitting station B receives this repeat signal correctly, then relay 404 moves its armature to the left, while relay 405 moves its armature to the right. The armature of relay 405, being supplied with negative potential, feeds the same to the armature of relay 404. Relay 404, however, throws the armature to the left so that this negative potential does not reach relay 21. The armature 25 of relay 21, therefore, remains on its back contact which is supplied with negative potential, suitable for initiating marking impulses of a code signal. Such a signal may be either the repetition of the previous signal or the transmission of a subsequent signal, as the case may be.

Since the answer-back signal decribed in the foregoing paragraph is of a marking frequency characteristic (calling for repetition of the signal), the transmitter starting magnet SM at station B is open-circuited by the placement of the armature of relay 405 to the right. Under this condition no new signal can be transmitted but the previous signal will be repeated, since marking signal potentials may be derived from the negative back stop against which the armature 25 of relay 21 rests.

When complete fading of the signal occurs relay 35 and relay 15 will both be operated. Repetition of the signal by station B is then called for, the same as in the case of reception of a mutilated signal.

When a code signal has been correctly received at station A some one or more of the relay pairs in groups 88 and 89 will be so actuated as to feed negative potential from the conductor 110 to relay 35, thus closing its contacts 34 and feeding positive potential to the left hand contact of relay 107.

Relay 107 in the device 33 remains normally closed until signal interference occurs. Therefore, relay 17 is actuated by this positive potential and throws its armature 16 against the left hand or positive contact. Station A then transmits a "go ahead" signal over its transmitting segment 18, this signal being characterized as a spacing frequency. Station B receives this signal by actuating relay 9 to feed + potential to relay 105 which is responded to by the device 20 in such manner that the armature of relay 405 is moved to the left, while the armature of relay 404 is moved to the right. Under these conditions relay 21 still remains unactuated but the starting magnet SM in the transmitter 22 at station B causes the subsequent signal to be sent out.

By the starting of the transmitting apparatus, the transmitting tongues 109 are connected to plus and minus voltages which correspond to the next signal, so that this signal is now transmitted in accordance with the passage of brush 403 successively over the segments 26 and 30 inclusive. In station A this signal is received during the passage of brushes 401 and 402 over segments 46 to 50 inclusive. The process described in the foregoing is thus repeated for sending successive signals so long as no interference occurs.

Relays 21 and 35 on being energized remain in the energized position for one complete revolution of the distributor. At the end of this revolution they are either de-energized or re-energized, according to the current impulses delivered thereto.

The purpose of relay 21 is to cause repetition of the monitoring signal in case that signal as transmitted from station A to station B becomes mutilated. In such a case let it be assumed that the device 20 at station B operates so that the armatures of both relays 404 and 405 are thrown to the right. Negative potential will then be supplied to relay 21 and cause it to close its contacts 25 for supplying positive potential to segment 31 on the transmitting distributor of station B. Station B will then transmit a special signal of spacing frequency characteristic back to station A which is received on segment 32 when the brush 402 traverses the same. This special signal then actuates relay 107 to open the circuit for relay 17. Relay 17, however, will remain locked in the position to which it was last energized and the answer-back signal will be repeated. Also five spacing current impulses are transmitted from station B. The receiving apparatus of station A does not respond to these five spacing impulses.

Normally the answer-back acknowledgment signal to which device 33 responds consists of an impulse of marking frequency, which frequency maintains the armature of relay 107 against its left hand contact. Like other signals, however, the answer-back acknowledgement signal may itself become mutilated, in which case relay 107 moves its armature to the right so that relay 17 remains in position to repeat the answer-back signal.

It is obvious that a certain time is necessary in order to transmit a monitoring or answer-back signal by means of the transmitting apparatus of the receiving station. This signal can only be transmitted when the five elements of the transmitted signal have been received and examined. Some time elapses, therefore, before the transmitting apparatus of the transmitting station can start again. The time of waiting between the successive transmissions of the same or different signals may, if necessary, be filled in with the signals of another telegraph system which employs the same transmission channel. This may be effected by means of contact members, which bring about in known manner a suitable time distribution, so that the individual telegraph systems can employ the transmission channel successively.

It is furthermore obvious that the connections as shown in Fig. 4 may also be constructed otherwise within the scope of the invention. Thus, for example, the devices 66, 88, 89, 20 and 33 are not confined to a definite form of construction. This already follows from the discussion of the protective devices shown in Figs. 1, 2 and 3. It is also not necessary to employ special interference relays 15, 21, 35. The circuits which are controlled by these relays may also be opened or closed by the protective devices themselves.

A further possible means of combating interference in a type printing telegraph system, according to the invention, resides in the application of the known principle, namely, that interference may be eliminated up to a certain extent by repeated transmission and reception of all signal elements and signals.

The repeating systems known for this purpose are generally only capable of combating interference of a certain character, that is to say, either interference due to additional current impulses, or interference due to the absence of current impulses.

For telegraph systems in which both types of interference may occur, means are usually provided such that the repeated reception of the marking current element or spacing current element results in the formation of a marking current signal or a spacing current signal, as the case may be.

This property of the known systems obviously shows their great disadvantage, namely, that the repeated reception of marking or spacing current elements, which are not caused by a repeatedly transmitted signal but by interference, can lead to the formation of an erroneous, but nevertheless unnoticeable signal.

If, on the other hand, the principle of repetition is employed in combination with the present invention the undisturbed reception of a single transmission is sufficient in order to render possible the reproduction of the correct signal in the actual receiving apparatus, because each interference is indicated with absolute certainty. If none of the transmissions is received undisturbed this is also rendered recognizable with certainty in the receiving apparatus. The unnoticed reproduction of a wrong signal is, therefore, impossible. Several constructional forms will be described hereinafter, by way of example, of a testing device according to the invention, which is adapted to be provided in the receiving installation between the protective device and the actual receiving apparatus, and which renders it possible to ascertain whether, in the repeated transmission, at least one of the received signals is correct. If this is so, this signal is passed on further to the telegraph apparatus so that the latter is set in operation. If, however, none of the signals passed on by the protective device is undisturbed, a monitoring signal is supplied in any manner to the telegraph apparatus, or the operation of the said apparatus is prevented.

The testing device must satisfy the condition of being able to ascertain and store the difference between three different units which can be given by the protective device, that is to say, between a marking signal, a spacing signal, and an interference signal (or zero signal). Various means may be employed for this purpose, and the following are worthy of note:

1. Condensers which are adapted to receive and re-transmit subsequently the difference between a positive current impulse, a negative current impulse and no current impulse.
2. Relay circuits which are adapted to receive and re-transmit the difference between a positive current impulse, a negative current impulse and zero current impulse, or between current impulses of different intensities, or between direct current and alternating current.
3. Relays in combination with mechanical devices for receiving, storing and retransmitting the three different units.

In Fig. 5 is shown a testing device employing a distributor or any other equivalent device which is driven synchronously, in rhythm with the repeated transmission, with the repeating device of the transmitter, which supplies successively to a condenser the quantities of electricity, given by the protective device during the repeated transmission of each signal and which subsequently employs the charge of this said condenser for actuating the receiving apparatus.

It has been assumed in the figure that each signal element is received three times and hence can be tested three times.

The current impulses which are given by a protective device, not shown (for example, according to Fig. 2) and which may comprise a positive current, a negative current or zero current in order to give a resting signal, a working signal, or an interference signal, are supplied to the brush 25. Contacts 21, 22 and 23 of a distributor (contact disc, contact drum, or the like) are closed just at the moments at which the repeated signal elements are received in the brush 25. It depends upon the construction of the distributor whether the contacts 21, 22 and 23 are separated from one another or are combined to form a single contact. The construction of the distributor is, of course, optional, the only condition being that it shall operate synchronously with the repeating system of the transmitter.

When any one of the contacts 21 is closed, the first current impulse given by the protective device has the opportunity of charging or not charging an associated condenser 26. The contact 22 does the same for a second current impulse and the contact 23 for a third current impulse. Since the three current impulses belong to the same signal element, the condenser 26 may be charged only in a certain direction either positively or negatively, or may remain uncharged. Current impulses of opposite directions are not possible in the same signal element, since the protective device either passes on the received signal correctly or not at all, and a wrong transmission is impossible.

After the lapse of the third repetition, the condenser is hence charged certainly in the correct direction, if any undisturbed signal element has been received at least once by the protective device. If this is not the case, the condenser is not charged.

After the condenser has functioned to receive three times a correct current impulse the distributor closes the contact 24, whereby the condenser can discharge through a polarized relay 27 and a non-polarized relay 28. The tongue of the polarized relay 27 is applied to the resting contact or the working contact, a resting or working current impulse being passed on to the telegraph apparatus by the energizing of the relay 28. If the condenser 26 has no charge, the non-polarized relay 28 is not energized. An interference signal can be then transmitted to the telegraph apparatus by the resting contact of this relay.

The non-polarized relay hence serves to distinguish current and zero current from one another, and the object of the polarized relay is to transfer the current direction (working or resting current) to the receiving apparatus. In other respects, it is clear that the circuit in which the condenser 26 is discharged may be constructed in different ways. This construction depends, for example, upon the nature of the telegraph apparatus connected thereto.

When, after the repeated transmission of a definite signal element, the condenser 26 has performed its action, it is in a position to receive the current impulses of a following signal element. The explanation given above has been limited to one signal element merely for the sake of simplicity, for example, to the first signal element of a signal comprising five elements.

The manner in which the condenser, after exerting its effect can, if necessary, be completely discharged for the sake of security, and the manner, when the nature of the connected telegraph apparatus demands, in which the relay 28 can be maintained energized for some time, for example, by means of a holding winding, and a special contact on the distributor, after the condenser has already been discharged, will now be explained.

Fig. 5 comprises three parts. A is a protective device which receives all incoming signal impulses, B is a repeating device including a testing device, and C is the receiving apparatus.

The protective device A is of the kind shown in Fig. 3. No current will be delivered by the tongue of the relay 98 on reception of a disturbed current impulse, as said tongue will then remain in its neutral or middle position.

The device B comprises a distributor having two contact rings I' and I" each consisting of a number of contact segments. These segments will be connected to a slip ring (not shown) one after another when the contact brush shown at the top is moved in the direction of the arrow. The receiving distributor I', I" is running synchronously with the transmitting distributor of the distant station. It has not been shown in Fig. 5 how this synchronism is maintained since this has already been explained in connection with Fig. 4.

The device B further comprises a testing device having five polarized relays 27, five non-polarized relays 28 and five contacts 24, one for each of the five units constituting a complete signal. The circuit arrangement of the relays 27 and 28 and the contacts 24 will be explained later.

The receiving apparatus C is shown as a start-stop teleprinter, the construction of which is known.

It will be seen that the left-hand distributor section I' is provided with fifteen contact segments. This means that each five-unit signal is transmitted and received three times in succession. The contact segments taking up the first transmission are denoted 21, those taking up the second transmission are denoted 22, and those taking up the third transmission are denoted 23.

The contact segments 21 are each connected to a condenser 26, and circuits are extended therefrom to responding contact segments of the groups 22 and 23. Thus, it will be clear that during the repeated reception of a certain five-unit signal each of the condensers 26 will have the chance of getting changed three times.

The right-hand distributor section I" is provided with five contact segments 24 and a contact segment 123. Each of the contact segments 24 is connected through a polarized relay 27 and a non-polarized relay 28 to one of the condensers 26. When the repeated reception of the five signal units has been finished, so that the condensers 24 are or are not charged, the contact brush shown at the top of I" is in the direction of the arrow and the five contact segments 24 are connected to the grounded brush 25 one after another, thereby enabling the five condensers 26 to be discharged over the corresponding relays 28 and 27. Those condensers having a certain charge when their contact segments 24 are passed by the contact brush will cause the corresponding relays 28 and 27 to be energized and those condensers not being charged will leave their relays 28 and 27 unaffected. The energization of those relays 28 through which current flows will be maintained by the closure of a holding contact 121 which is connected in series with an auxiliary winding 130. The right-hand terminal of this auxiliary winding 130 is connected to the tongue of the polarized relay 27, so that the current flowing through the auxiliary winding is always of the same direction as that flowing through the main winding.

From the above it follows that if all the condensers 26 have been charged during the repeated reception of the five-unit signal all relays 28 and 27 will be energized, and if only part of the condensers have been charged only part of the relays 28 and 27 will be energized. As explained in connection with Fig. 5, a charged condenser 26 means that the signal unit in question has been correctly received at least once during the repeated transmission, and an uncharged condenser 26 means that said unit has been mutilated three times. Consequently, it depends on whether all or only part of the signal units have been received correctly if all or only part of the relays 28 and 27 will be energized when the contact segments 24 are passed by the contact brush.

Now, each of the relays 28 is provided with an auxiliary contact 124 and all these contacts 124 are connected in series between a relay 122 and the contact segment 123 of the distributor. The contact 123 is closed when all contact segments 24 have been passed by the contact brush, and when this happens the relay 122 will or will not be energized, according to whether all the auxiliary contacts 124 or only part of them have been closed by the relays 128. In the former case the circuit of the starting magnet M of the receiving apparatus C is closed by the tongue of the relay 122, and in the latter case it is not. If the starting magnet M is energized, the voltages supplied to the tongues of the five polarized relays 27 are taken off by the teleprinter C one after another and they are supplied to the printing magnet shown which controls the printing mechanism. If, on the other hand, not all the relays 28 have been energized, the relay 122 will not be operated and starting of the teleprinter C will be prevented.

Thus, it will be seen that the signal will be recorded when it has been received correctly, and that recording will be prevented when one or more of its five units have been disturbed. Of course, it is also possible to produce a record any time but to print an additional disturbance mark when the reception of the signal has been mutilated.

To the contact segment 123 there is further connected a slowly operating relay 125 which is energized somewhat later than the relay 122 and which serves for the purpose of interrupting the holding circuits of the five relays 28 (by opening the contacts 126 and 127), so that these relays are de-energized and restored to the normal condition. The system is then ready to take up a fresh five-unit signal.

Fig. 6 shows diagrammatically the construction of another testing device in which a number of relay chains is employed. It has been assumed that each signal element is transmitted twice. The relay chains are closed one after the other by a distributor or an equivalent device, driven synchronously with the repeating device of the transmitting end, at moments in which the individual current impulses or zero current impulses, given by the protective device during the repeated transmission of the same signal element, arrive at the testing device. The relay chains are constructed in such manner that testing of the received current impulses is carried out and the receiving apparatus is brought into action when at least one of the repeated transmissions is received undisturbed.

The relay chains of the testing device each comprise a non-polarized relay 41 with a holding contact 36, and in series therewith a polarized relay 42. The contact 31 of the distributor is closed at the moment at which the protective device operates on the first reception of the twice transmitted signal element. If the reception is undisturbed the protective device gives rise to a working current or a resting current and the non-polarized relay is energized and is kept energized by means of its holding contact 36. The polarized relay 42 applies its tongue in accordance with the direction of the received current impulse, either to the resting contact or to the working contact, so that this current impulse is passed on by way of the contact 37 of the non-polarized relay 41 to the second relay chain, whereby this second relay chain which was originally connected to the leal 35 by the contact 39 is disconnected from the protective device.

At the moment of the reception of the second transmission the contact 32 of the distributor is closed, the non-polarized relay 43 is then energized and is maintained energized by way of the contact 38, while by means of the polarized relay 44 a current impulse is supplied to the telegraph apparatus. The contacts 33 and 34 of the distributor have the object of short-circuiting the holding winding of the relays 41 and 43 and of returning the circuit into the original state, after the respective relay chains have completed their action.

If an interference occurs in the first transmission of the signal element, the protective device does not transmit any current impulse. In this case the non-polarized relay 41 is not energized, the result of which is that the second relay chain remains connected to the lead 35. On the second reception of the repeated signal element, the second relay chain then comes into action. If this reception is undisturbed the relays 43 and 44 are energized, and the telegraph apparatus receives a corresponding current impulse. If, however, the second transmission also is disturbed, the non-polarized relay 43 is not energized and an interference signal is supplied to the telegraph apparatus by means of the contact 40 and a contact, not shown, on the distributor. If the contacts 31, 32, 33, 34 of the distributor are closed in known manner in the correct sequence, the first relay chain will be ready to receive a new current impulse, while the telegraph apparatus is still being fed by the second relay circuit.

A more detailed description of Fig. 6 follows:

Five pairs of relays are shown, each pair being appropriate to one of the five elements of a five-unit code signal.

The current impulses are received from a protection device and they are transferred to the testing device shown, by way of the conductor 35.

The distributor 1 includes contact segments 31 and 32. By means of the contact brush 25 shown at the top of this distributor, the segments 31 and 33 are connected to ground one after another. The distributor 1 is running synchronously with the transmitting distributor of the distant station. Just how this synchronism may be maintained has already been explained in connection with Fig. 4.

The five second relay pairs of Fig. 6 are shown below the five first relay pairs. Each of these second relay pairs comprises a non-polarized relay 43, a polarized relay 44 and a contact 32. The conductors leaving the tongues of the relays 44 of the second relay pairs are each connected to one of the contacts of a teleprinter C which is of the kind already described in connection with Fig. 5.

The collaboration between the relays 43 of the five second relay pairs and the teleprinter C of Fig. 6 is the same as that between the relays 28 and the teleprinter of Fig. 5. The same reference numbers have been used in this connection, so that it may be easily checked how in Fig. 6 the teleprinter C is operated and how the relays 43 are restored to their normal condition when the repeated transmission of the five signal units has been finished.

It is to be noted that in each of the five first relay pairs the contact 33 is arranged in front of the contact 31 in the distributor 1. This is possible because the only requirement to be met by the contact 33 is that it shall have been closed, in order to restore the corresponding relay 41 to its normal condition at the time that the contact 31 is operated.

Fig. 7 shows a third construction of the testing device. This operates substantially in a mechanical manner.

At the transmitting end of the telegraph system, a perforated strip 57, on which the signals to be transmitted are fixed, is passed through three automatic transmitters 51, 52, 53 in succession. These transmitters are so connected to a distributor 59 that they are connected in succession to the transmission channel.

The perforated strip runs through the three transmitters and the elements of each signal are transmitted automatically three times. The time intervals between the successive transmissions are quite optional.

At the receiving end are three so-called reperforators 54, 55, 56. These are located behind a distributor 61, which follows the protective device 60 and is driven synchronously with the distributor 59 of the transmitting station. The receiving distributor connects the three reperforators to the transmission channel at the moments at which the current impulses originating from the transmitting station set the protective device 60 into operation.

A strip 58, the speed of which is equal to that of the perforated strip 57 of the transmitting station, is passed through the three reperforators. A given signal is transmitted on the first reception to the reperforator 54 and this reperforator produces a perforation in the strip for each signal element or, if one or more of the signal elements are received disturbed, does not produce perforations for these elements.

In order that the reperforators can show the difference between the three different units (positive current impulse, negative current impulse and no current impulses), the perforations caused, for example, by a positive or resting current impulse are offset in the direction of the strip relatively to the perforations caused by a negative or working current impulse. The relative position is shown in Fig. 8. This figure relates to the case in which each signal comprises five units. In the transverse direction of the strip there is room for five perforations. The perforations for the resting units are not situated, however, on the same transverse line as those on the working units. It has, furthermore, been assumed that the signal which should be received by the reperforator 54 consists of three resting units and two working units.

At the moment at which the repeatedly transmitted signal is received for the second time, the distributor switches in the second reperforator 55. At this moment the strip 58 has been advanced until the perforations caused by 54 on the first reception are situated exactly opposite the perforating members of the reperforator 55. If now on the first reception no perforation was produced at certain points of the strip 58, due to interference of one or more of the five signal elements, the reperforator 35 can correct this fault, unless an interference again occurs just at this moment. The same applies for the third reperforator 56 which comes into operation on the third reception of the transmitted signal.

This testing device also operates in such a manner that the receiving apparatus is set into operation when the protective device passes on at least once a signal (or signal element) which has not been mutilated by interference.

When, due to the occurrence of interference, none of the three reperforators is successful in producing a correct perforation, there is in the strip a non-perforated place which is shown in Fig. 9 and which renders recognizable the wrong reception with absolute certainty.

After the strip has left the last reperforator it is passed, for example, to an apparatus which converts the perforations to type printing. This type printing apparatus may be so constructed that in the absence of a perforation it produces an interference signal.

In addition to the provisions on the lines set forth in the foregoing of a protective device and a testing device, the invention may also be employed in telegraph systems with repeatel transmission of all signals by combining a protective device with two known repeating systems, one for the working current and the other for the resting current.

We claim:

1. In a radio telegraph system having both a transmitter and a receiver at each of two stations, means for applying frequency-discriminating modulations to the marking and spacing signals respectively, means at the receiver of one station, including a monitoring relay, responsive to the reception of disturbed signals for initiating an answer-back signal for transmission to the second station where said marking and spacing signals originated, and means at said second station responsive to the reception of said answer-back signal for causing the transmitter to repeat the signals that were disturbed in transit.

2. In a radio telegraph system a transmitter for sending marking and spacing impulses having frequency-distinguished modulations, a receiver having a plurality of filters for selectively accepting said impulses, relay means responsive in one way to the reception of an impulse having a marking-frequency characteristic, and responsive in a different way to the reception of an impulse having a spacing frequency characteristic, a device operable by said relay means for detecting the presence of mutilated signals, a repeater associated with said transmitter for causing each signal to be transmitted a plurality of times, means responsive to the operation of said mutilated-signal-detecting device for so controlling the operation of said receiver that it is set in operation to record only the un-mutilater signals, and further means responsive to the operation of said detecting device when a given signal and each of its repetitions are all mutilated for sending a repeat-signal back to said transmitter.

3. In a two-way radio telegraph system, transmitting and receiving devices at each of two stations, a code signal transmitting distributor and a code signal receiving distributor at each station, a monitoring device associated with each receiving distributor, means responsive to the reception of a mutilated code signal for enabling said monitoring device at one station to transmit a repeat-signal to the other station, and means at the other station operative in response to said repeat signal for causing the transmitting distributor thereof to repeat the code signal that was previously mutilated.

4. In a two-way radio telegraph system, transmitting and receiving devices at each of two stations, a code signal transmitting distributor and a code signal receiving distributor at each station, a monitoring device associated with each receiving distributor, means responsive to the reception of a correct code signal for enabling said monitoring device at one station to transmit a "go-ahead"-signal to the other station, and means at the other station for causing the transmitting distributor thereof to continue the transmission of code signals of a message without repetition in response to the reception of successive "go-ahead"-signals.

5. In a radio telegraph system, a transmitting station and a receiving station, a code signal keyer at the transmitting station, a signal storage device associated with signal responsive means at the receiver, means at the transmitter for normally so actuating said keyer as to cause each code signal combination to be repeated at least once, means including a printing telepraph instrument at the receiver for recording the reception of a character whenever one at least of the repeated code signals is stored without mutilation, means operable for transmitting an answer-back signal from the receiving station to the transmitting station only when all of the repeated code signals as stored are mutilated, and means at the transmitting station responsive to said answer-back signal for initiating a keying operation thereby to again repeat the code signal that was mutilated.

6. In a radio telegraph system, a transmitting station and a receiving station, a code signal keyer at the transmitting station, a signal storage device associated with signal responsive means at the receiver, means at the transmitter for normally so actuating said keyer as to cause each code signal combination to be repeated at least once, means including a printing telegraph instrument at the receiver for recording the reception of a character whenever one at least of the repeated code signals is stored without mutilation, and means operable at the receiving station whenever all of the repeated code signals as stored are mutilated for sending an error designating signal back to said transmitting station.

7. In a two-way telegraph system, a plurality of stations, each station having a code impulse transmitter and a code impulse receiver, an error detecting device operable by each receiver upon reception of a mutilated signal, means operable under control of said error detecting device for causing the transmitter at the station where said mutilated signal is received to send an answer-back signal to the station of origin of signals including said mutilated signal, and means associated with the receiver and transmitter at said station of origin and operable in response to the reception of said answer-back signal for causing a repetition of the signal that was mutilated.

8. In a two-way telegraph system a plurality of stations including station A and station B, each station having a transmitter and a receiver, means for causing the transmitter at station A to normally send traffic signals consisting of code impulses, means to arrest the normal operation of said transmitter and to cause a repetition of a given traffic signal, an error-detecting device operable under control of the receiver at station B upon reception of a mutilated traffic signal, means for causing the transmitter at station B to send one of two answer-back signals selectively, the first of said answer-back signals being in response to the operation of said error-detecting device when a mutilated signal is received, and the second of said answer-back signals being in response to the reception of each un-mutilated traffic signal, and means operable by the receiver at station A in response to answer-back signals from station B for selectively controlling the said means at station A whereby the transmitter thereat is caused to continue normal sending of traffic signals or to repeat the same.

9. In a two-way telegraph system of the character described having two stations, each station having apparatus for transmitting and receiving current impulses, a protective device associated with the receiving apparatus at one station operable upon the reception of a disturbed signal for sending an answer-back signal to the transmitting station, means at the transmitting station operable upon reception of the answer-back signal for repeating the disturbed signal, said protective device also being operable upon the reception of an undisturbed signal for sending another answer-back signal to the transmitting station, means at the transmitting station operable upon receiving the last-mentioned signal for effecting the transmission of the next signal, and means at the transmitting station operable upon the reception of an answer-back signal of the first mentioned type for stopping the transmission of the normal signals and for transmitting a special signal.

10. In a telegraph system, a transmitter having means for sending code signals over a channel of communication, each of said code signals being composed of marking and spacing elements of distinguishable electrical characteristics, a receiver responsive to said code signals and also responsive to static and fading conditions by which communication over said channel is influenced, means included in said receiver for discriminating between the reception of code signals which are mutilated by said static and fading conditions, and those which are not, a printer operable only under control of the received unmutilated code signals, a monitoring transmitter connected to said receiver and operable to send back a special signal in response to the reception of a mutilated code signal, a monitoring receiver connected to the first said transmitter, and means operable by said monitoring receiver in response to the reception of said special signal for causing the first said transmitter to repeat the code signal that was mutilated.

11. A telegraph system in accordance with claim 10 and including means in said monitoring receiver for discriminating between the reception of special signals which are mutilated by said static and fading conditions and those which are not, and means operative when one of said special signals becomes mutilated for causing said monitoring transmitter to repeat the same.

12. In a telegraph system, a transmitter having means for sending code signals over a channel of communication, each of said code signals being composed of marking and spacing elements of distinguishable electrical characteristics, a receiver responsive to said code signals and also responsive to static and fading conditions by which communication over said channel is influenced, means included in said receiver for discriminating between the reception of code signals which are mutilated by said static and fading conditions, and those which are not, a printer operable only under control of the received unmutilated code signals, a monitoring transmitter connected to said receiver and operable to send back either of two special signals, one of which has the significance of requesting repetition and the other of which implies that the first said transmitter is to "go ahead," a monitoring receiver connected to the first said transmitter, and means operable by said monitoring receiver in response to said special signal for so controlling the first said transmitter that code signals initially mutilated will be repeated and the transmission of unmutilated code signals will proceed uninterruptedly.

13. In a two-way telegraph system, two terminal stations A and B, each of said stations comprising a transmitter and a receiver, a uniform length code signal sender and a code-responsive printer at each station, means operable by each said receiver upon reception of unmutilated code signals for actuating its printer, said means being also operable upon reception of a mutilated code signal for initiating an answer-back signal, a distributor at each station, one of said distributors being maintained in synchronism with the other, transmitting segments on the distributor of station A corresponding to receiving segments on the distributor of station B, and vice versa, certain of said segments being appropriate to the elements of the uniform length code signals, at least one segment of each distributor being appropriate to the sending function of the answer-back signal and at least one segment of each distributor being appropriate to the receiving function of the answer-back signal, a relay operable by the first said means at station B for impressing an answer-back signal on the sending segment appropriate thereto, means connected to the answer-back receiving segment at station A for producing a response capable of causing station A to repeat its previously transmitted code signal, a corresponding relay at station A and corresponding repeat-control means at station B.

14. A two-way telegraph system in accordance with claim 13 and having means for sending and receiving two differently characterized answer-back signals, one of said answer-back signals being sent and received after reception of each unmutilated code signal and being effective to permit continued transmission of code signals by the station at which said answer-back signal is received, and the other of said answer-back signals being effective to set back the code signal sender, thereby to cause repetition of a signal that was mutilated when initially sent.

ARJEN BAKKER.
HENDRIK CORNELIS ANTONIE
VAN DUUREN.